(12) United States Patent
Mukherjee

(10) Patent No.: US 6,904,027 B1
(45) Date of Patent: Jun. 7, 2005

(54) SYSTEM AND METHOD FOR CALL TRANSFER IN PACKET SWITCHED LOCAL AREA NETWORKS

(75) Inventor: Subrata Mukherjee, Plano, TX (US)

(73) Assignee: Telefonaktiebolaget LM Ericsson, Stockholm (SE)

( * ) Notice: Subject to any disclaimer, the term of this patent is extended or adjusted under 35 U.S.C. 154(b) by 756 days.

(21) Appl. No.: 09/641,437

(22) Filed: Aug. 17, 2000

(51) Int. Cl.⁷ ............................................. H04Q 7/00
(52) U.S. Cl. .................. 370/331; 370/352; 370/401; 370/467; 379/207.01; 379/212.01
(58) Field of Search ................................ 370/310, 312, 370/331, 338, 352, 401, 466, 467, 351; 379/207.01, 212.01, 215.01, 158, 114

(56) References Cited

U.S. PATENT DOCUMENTS

| | | | | |
|---|---|---|---|---|
| 5,999,965 A | * | 12/1999 | Kelly ........................ | 709/202 |
| 6,014,377 A | * | 1/2000 | Gillespie .................... | 370/351 |
| 6,466,662 B1 | * | 10/2002 | Klaghofer et al. ...... | 379/212.01 |
| 6,535,730 B1 | * | 3/2003 | Chow et al. ............... | 455/416 |
| 6,577,622 B1 | * | 6/2003 | Schuster et al. ........... | 370/352 |
| 6,603,849 B2 | * | 8/2003 | Lin et al. ................ | 379/221.01 |
| 6,614,784 B1 | * | 9/2003 | Glitho et al. .............. | 370/352 |
| 6,646,997 B1 | * | 11/2003 | Baxley et al. .............. | 370/260 |
| 6,650,745 B1 | * | 11/2003 | Bauer et al. ........... | 379/202.01 |
| 6,650,901 B1 | * | 11/2003 | Schuster et al. .............. | 379/45 |
| 6,687,360 B2 | * | 2/2004 | Kung et al. ............ | 379/211.02 |
| 6,731,609 B1 | * | 5/2004 | Hirni et al. ................. | 370/260 |
| 6,731,630 B1 | * | 5/2004 | Schuster et al. ............ | 370/356 |

FOREIGN PATENT DOCUMENTS

EP      1 014 665 A     6/2000

OTHER PUBLICATIONS

Liao W et al: "VOLP Mobility in IP/Cellualar Network Internetworking" IEEE Communications Magazine, IEEE Service Center. Piscataway, J.J., US, vol. 38, No. 4, Apr. 2000, pp. 70–75, XP000949644 ISSN: 0163–6804 p. 72, left–hand column, line 35—p. 74, right–hand column, line 72.

"Call Transfer Supplementary Service for H.323" ITU–T Recommendation H. 450–2, XX, XX, Feb. 1998, pp. 1–51, XP002152631 the whole document.

* cited by examiner

Primary Examiner—Hassan Kizou
Assistant Examiner—Dmitry Levitan

(57) ABSTRACT

A telecommunications system and method is disclosed for providing call transfer services within H.323 networks, in which the transferring end-point that invokes call transfer relays the media packets received from the transferred end-point to the transferred-to end-point, and likewise relays media packets received from the transferred-to end-point to the transferred end-point. However, the transferring end-point is taken out of the call after transferring the call so that it can make/receive new calls.

21 Claims, 14 Drawing Sheets

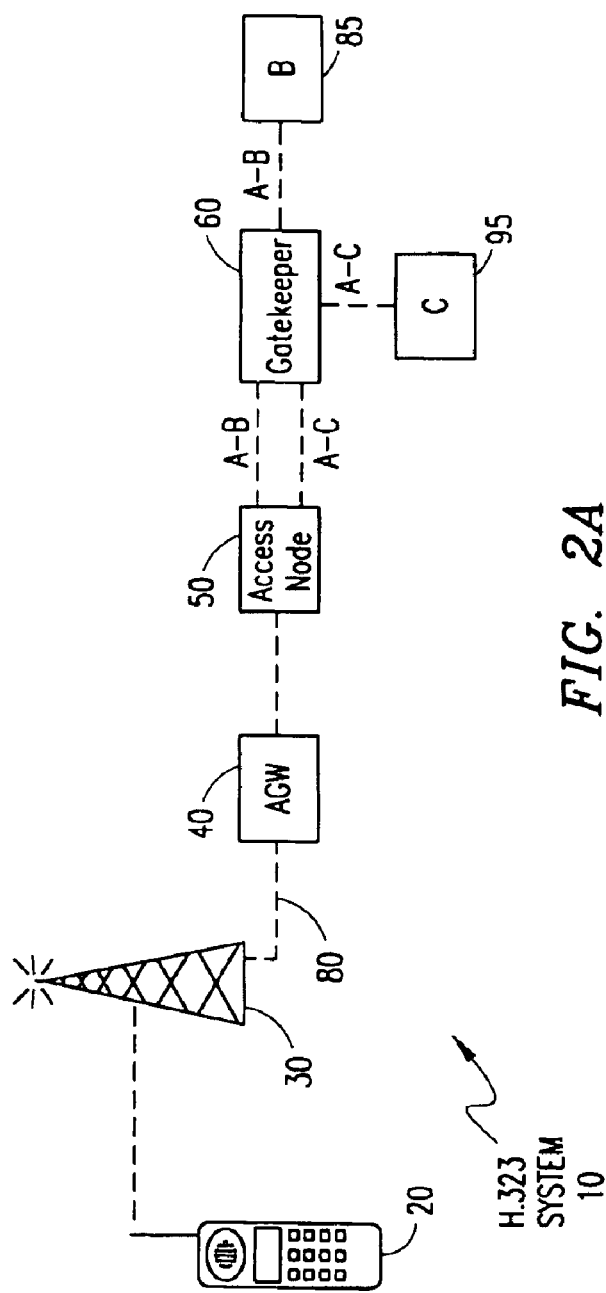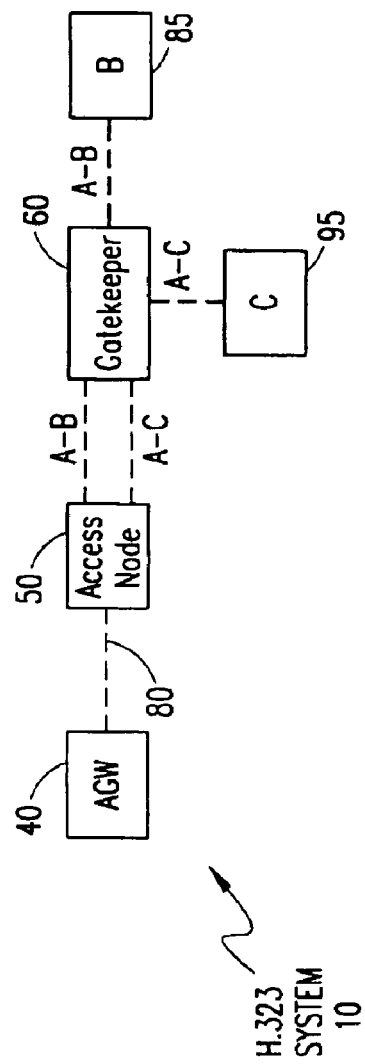
FIG. 2A
FIG. 2B

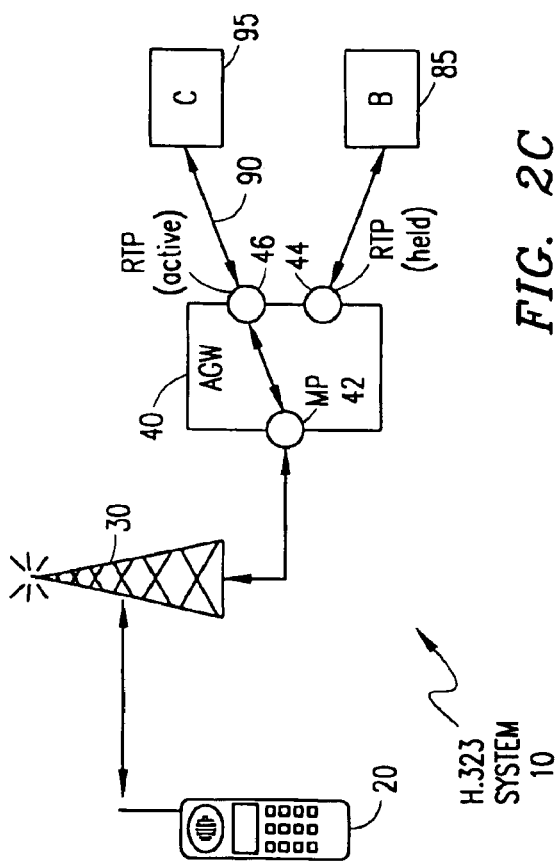
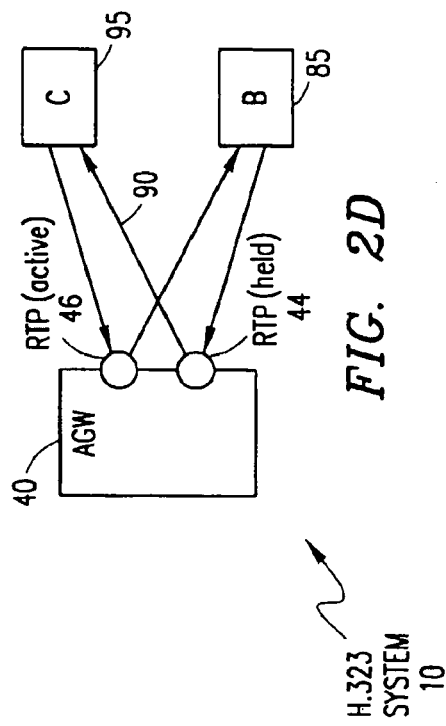
FIG. 2C
FIG. 2D

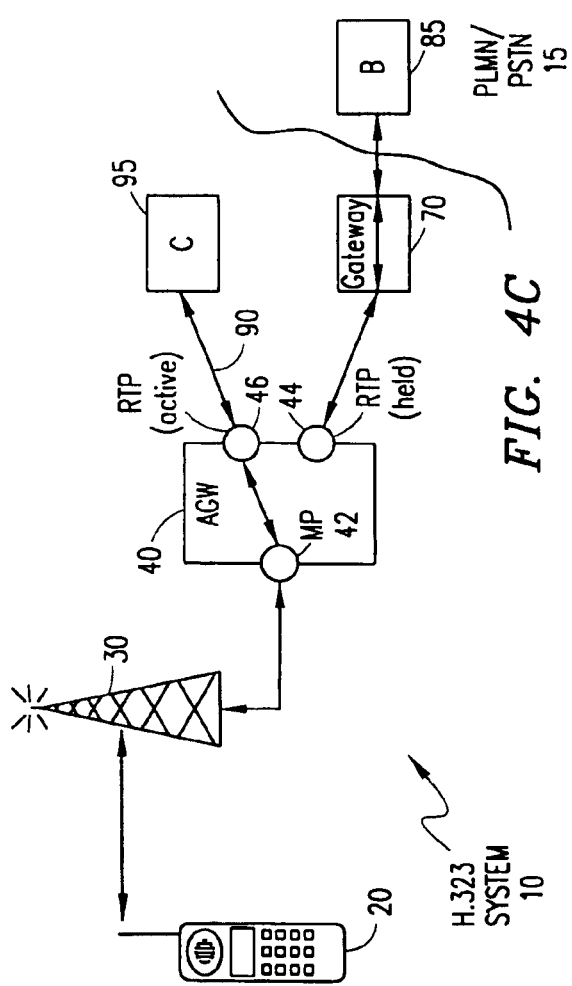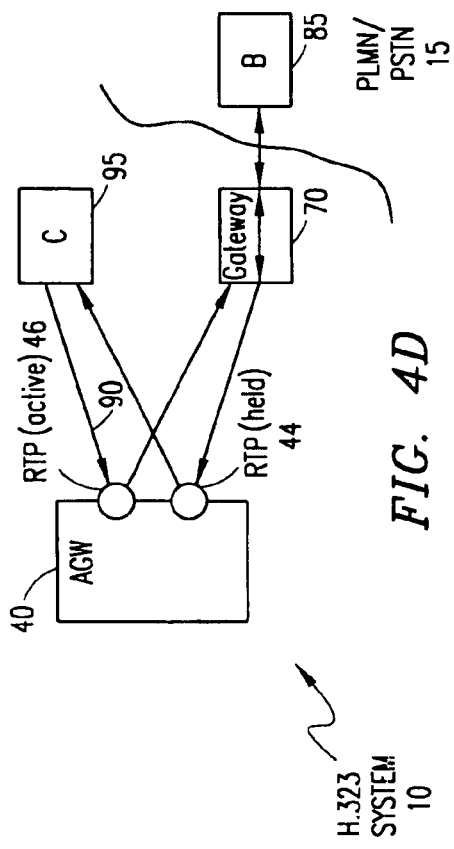

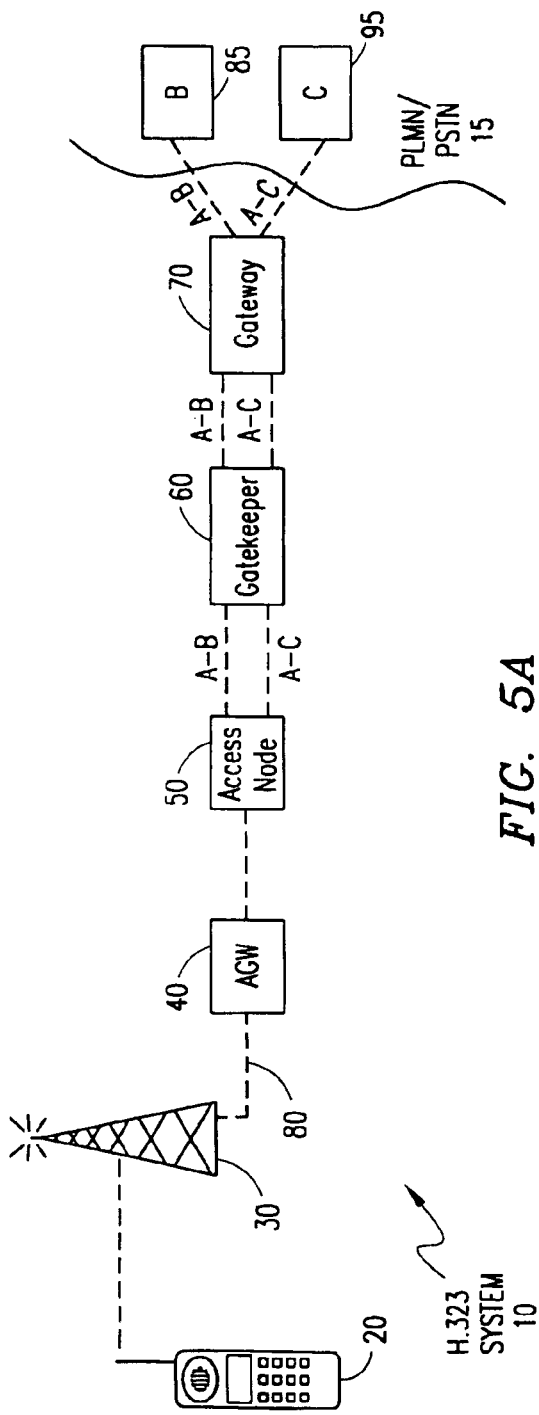
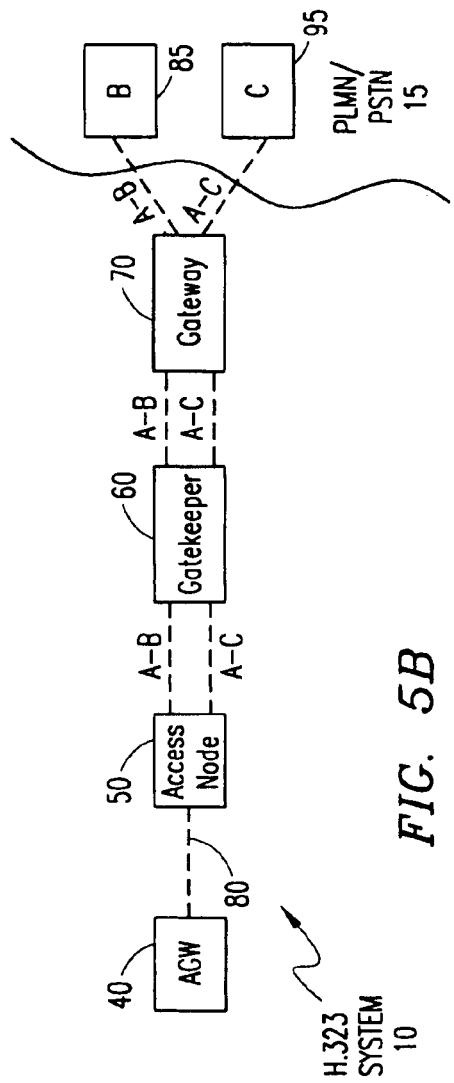
FIG. 5A
FIG. 5B

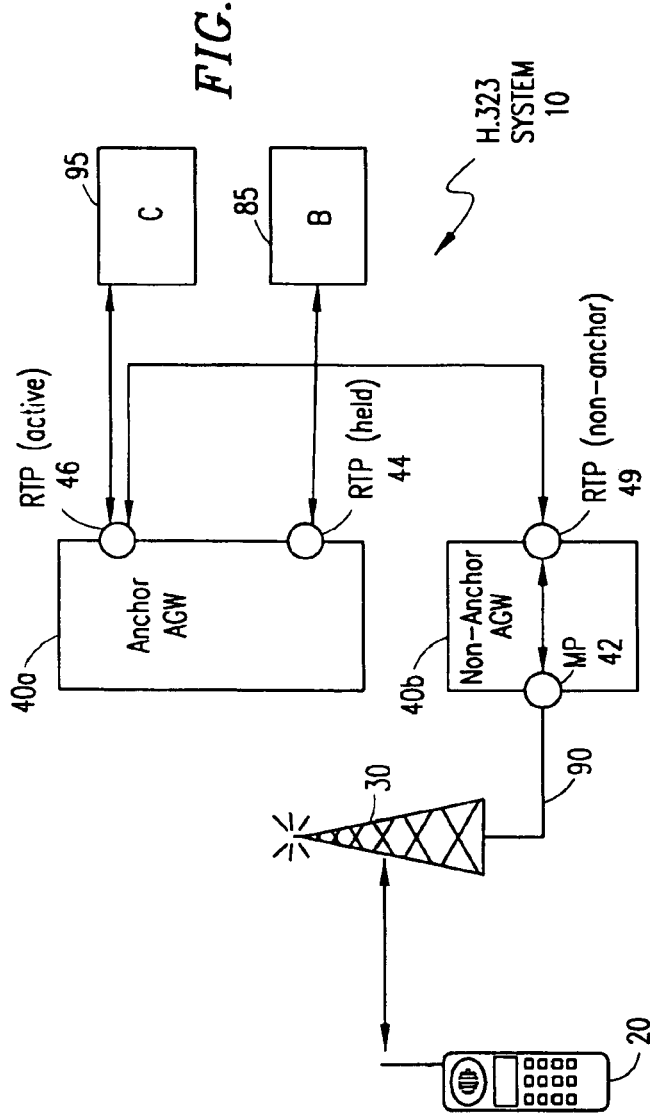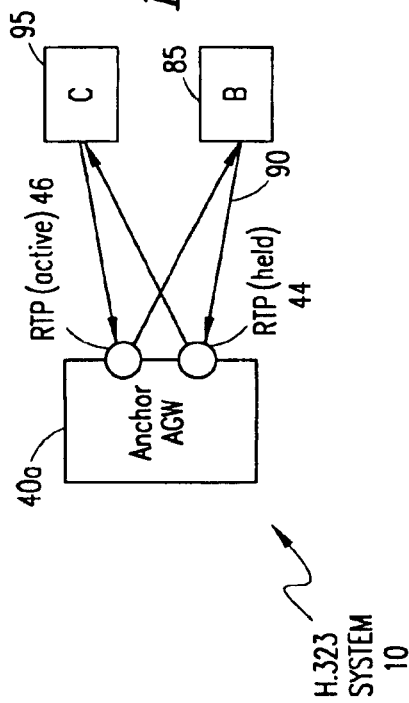

SYSTEM AND METHOD FOR CALL TRANSFER IN PACKET SWITCHED LOCAL AREA NETWORKS

BACKGROUND OF THE PRESENT INVENTION

1. Field of the Invention

The present invention relates generally to packet switched local area networks, and specifically to call transfer mechanisms within packet switched local area networks.

2. Background of the Present Invention

Different multi-media standards have been defined for different types of systems in which the underlying transport is a Packet Based Network implementing voice over Internet Protocol (IP). For example, for Integrated Services Digital Networks (ISDN), the H.320 and H.324I/M standards are utilized. In addition, H.324 standards apply to Public Switched Telephony Networks (PSTNs), whereas H.324M standards apply to Public Land Mobile Networks (PLMNs). Furthermore, for Local Area Networks (LANs), the H.323 standards are used.

Within H.323 systems, H.323 endpoints may be integrated into personal computers, implemented in stand-alone devices, such as wireline or wireless telephones or implemented in wireless telecommunications systems. H.323 endpoints advantageously provide real-time audio, video and/or data communications capabilities in point-to-point or multipoint conferences.

Each H.323 endpoint is registered with a Gatekeeper for the H.323 system. The Gatekeeper stores an IP to that H.323 endpoint is requested, the Gatekeeper knows how to route the connection. If the H.323 endpoint is a Mobile Station (MS), such as a cellular telephone, the IP address for the MS typically includes the IP address for a Mobile Switching Center (MSC) serving the MS for call signaling.

H.323 systems currently support call transfer services, which allows the transferring end-point, which is the party that has one held call and one active call, to connect the remote end-points of the two calls and disconnect itself. The protocol used by the H.323 network for the call transfer function is specified by H.450 standards. In the H.450 solution, after the transferring end-point invokes call transfer, the original two calls are released and a new call is established between the transferred end-point and the transferred-to end-point.

Once the transferring end-point transfers the call, if both the transferred end-point and transferred-to end-point are within the H.323 system, the speech and/or data (commonly referred to as the media stream or media packets) are routed directly between the transferred end-point and transferred-to end-point. This requires both the transferred end-point and the transferred-to end-point to change the address of sent packets from the transferring end-point's address to each other's address. In order to accomplish this, both the transferred end-point and the transferred-to end-point must have knowledge of the call transfer and have the ability to perform the address switch. Implementing part of the call transfer functionality within the H.323 end-points themselves is neither efficient, nor desirable.

In addition, the H.450 solution is extremely difficult to implement when either the transferred subscriber and/or the transferred-to subscriber are within another system, such as the PLMN/PSTN. Since the PLMN/PSTN does not support H.323 protocols, when the transferred and/or transferred-to subscriber belongs to the PLMN/PSTN, the H.450 standard will not be supported by these subscribers.

Therefore, in order to perform call transfer when one or both of the remote parties is within the PLMN/PSTN, the H.323 network must intercept the H.450 messages and simulate end-point behaviors in the Gateway that is responsible for PLMN/PSTN and H.323 interworking. For example, if the transferring subscriber (hereinafter referred to as the A subscriber) is within the H.323 network and both the transferred subscriber (hereinafter referred to as the B subscriber) and the transferred-to subscriber (hereinafter referred to as the C subscriber) are outside of the H.323 network, after subscriber A transfers the call, the speech and/or data from subscriber B is routed to the Gateway. The Gateway must have knowledge about the call transfer and must route the speech and/or data to subscriber C. Similarly, the speech and/or data from subscriber C is routed to the Gateway, and the Gateway must route the speech and/or data from subscriber C to subscriber B. Thus, with the current H.450 standard, the Gateway must include the end-point functionality for H.450 call transfer handling. It is neither desirable, nor efficient, to require Gateways to include part of the call transfer functionality.

It is, therefore, an object of the present invention to route the media packets through the transferring end-point after the call is transferred between the transferred and transferred-to end-points.

It is a further object of the present invention to enable the transferring end-point to be free to make other transactions after call transfer.

SUMMARY OF THE INVENTION

The present invention is directed to telecommunications systems and methods for providing call transfer services within H.323 networks. After invoking call transfer, the transferring end-point relays the media packets received from the transferred end-point to the transferred-to end-point, and likewise relays media packets received from the transferred-to end-point to the transferred end-point. However, the transferring end-point is taken out of the call after transferring the call so that it can make/receive new calls. Advantageously, inter-working with the PLMN/PSTN is easy to implement since no call transfer functionality needs to be included within the Gateway. In addition, no is additional functionality needs to be included within the transferred and/or transferred-to end-points since both end-points still route media packets to the transferring end-point.

BRIEF DESCRIPTION OF THE DRAWINGS

The disclosed invention will be described with reference to the accompanying drawings, which show important sample embodiments of the invention and which are incorporated in the specification hereof by reference, wherein:

FIGS. 2A–2D are block diagrams of an H.323 system implementing the call transfer service where the transferring end-point, transferred end-point and transferred-to end-point are all within the H.323 system, in accordance with embodiments of the present invention;

FIGS. 4A–4D are block diagrams illustrating the implementation of the call transfer service within an H.323 system where the transferring end-point and transferred-to endpoint are within the H.323 system, but the transferred subscriber is outside of the H.323 system, in accordance with embodiments of the present invention;

FIGS. 5A–5D are block diagrams illustrating the implementation of the call transfer service within an H.323 system where the transferring end-point is within the H.323 system, but the transferred subscriber and transferred-to subscriber are outside of the H.323 system, in accordance with embodiments of the present invention;

FIGS. 6A and 6B are block diagrams of an H.323 system implementing the call transfer service where the transferring end-point has performed an inter-A-bis Gateway (AGW) handover;

DETAILED DESCRIPTION OF THE PRESENTLY PREFERRED EXEMPLARY EMBODIMENTS

Figure 1:
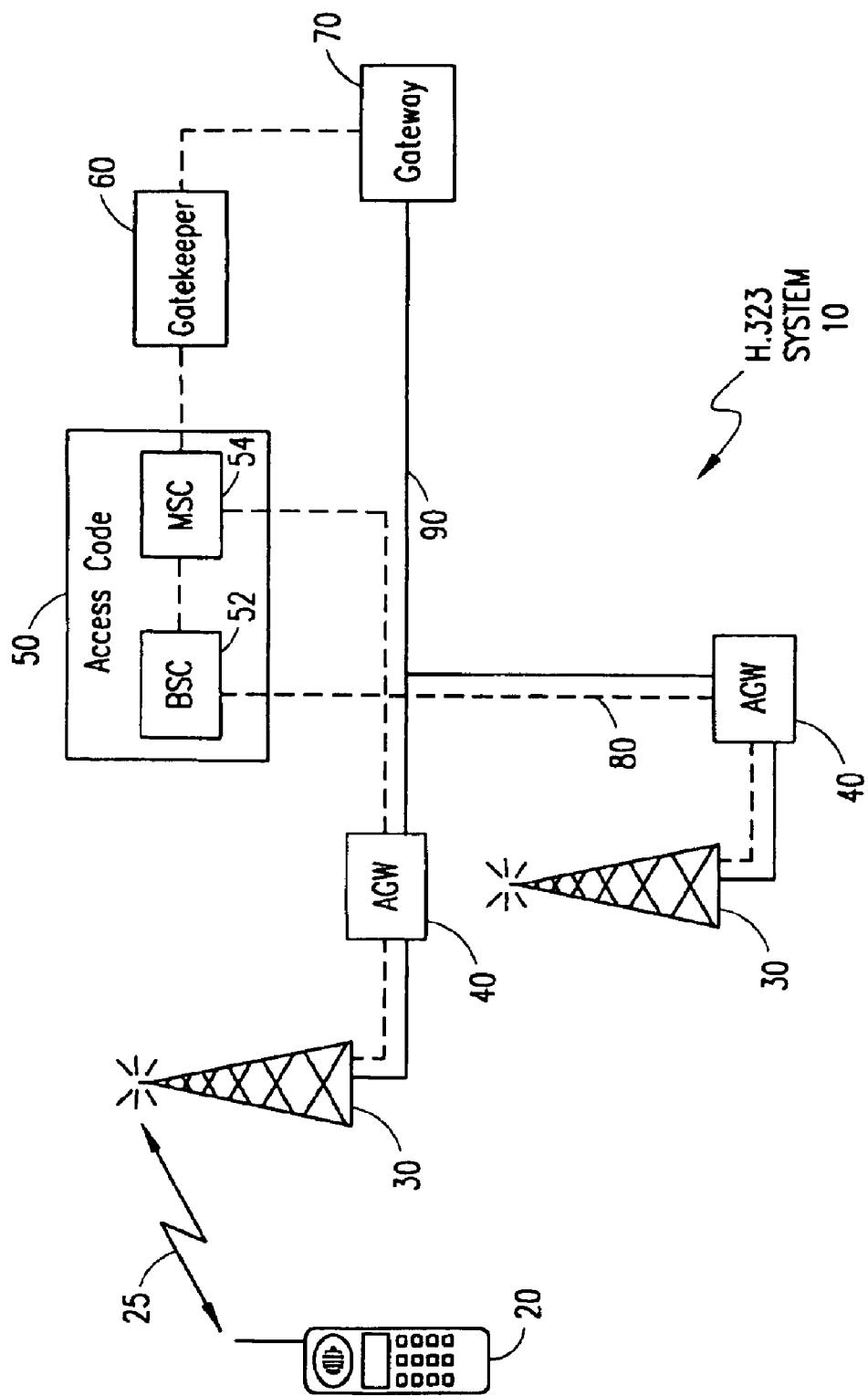
FIG. 1 is a block diagram of a conventional H.323 system.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Within H.323 systems, each H.323 end-point is registered with an H.323 Gatekeeper for the H.323 system. The Gatekeeper stores an Internet Protocol (IP) address for the H.323 end-point, and uses the IP address to route a connection to that H.323 end-point. If, as is shown in (MS) 20, such as a cellular telephone, the IP address for the MS 20 for call signaling typically includes the IP address for a Mobile Switching Center (MSC) 54 serving the MS 20. For media transfer (speech and/or data), the IP address includes the IP address of an A-bis Gateway (AGW) 40 connected to the MSC 54, along with a specific port number for that MS 20. The port number is associated with a specific media port for the MS 20 within the AGW 40. Therefore, in the case of MS's 20, the H.323 end-point from the Gatekeeper's perspective consists of at least both the AGW 40 and the MS 20 for media connections.

The AGW 40 is connected to an associated Base Transceiver Station (BTS) 30, which operates as a transceiver for transmitting and receiving data and control messages to and from the MS 20 over an air interface 25. Thus, the AGW 40 has both a signaling connection (shown by the dotted line 80) and a media connection (shown by the solid line 90) to it's associated BTS 30. In addition, each AGW 40 may have a media connection 90 to other AGW's 40 depending on the call scenario.

The AGW 40 also has a signaling connection 80 to the MSC 54 and a Base Station Controller (BSC) 52, which is responsible for controlling one or more BTS's 30. It should be noted that the MSC 54 and BSC 52 nodes can be included together within a single node, referred to herein as an Access Node 50. It should further be noted that within the GSM on the Net system, the MSC 54 is termed a Network Access Controller and the BSC 52 is termed a Radio Network Server. The AGW 40 converts between the circuit-switched signaling and data transport used by the BTS 30 and the packet-switched signaling and data transport used by the H.323 system 10.

Calls between H.323 end-points 20 and subscribers outside of the H.323 system 10, e.g., subscribers within another H.323 system, the Public Switched Telephone Network (PSTN) or the Public Land Mobile Network (PLMN), are routed through a Gateway 70, which converts the speech and/or data between the IP format used by the H.323 system 10 and the PLMN/PSTN format. Calls coming into the H.323 system 10 from outside are routed through the Gateway 70 to the Gatekeeper 60, and subsequently to the desired H.323 end-point 20. Once a connection is established, media packets are transmitted directly between the H.323 end-point 20 and the Gateway 70 over the media connection 90, and speech and/or data is transmitted between the Gateway 70 and the non-H.323 subscriber (not shown) via the non-H.323 subscriber's network (not shown).

With reference now to FIGS. 2A–2D of the drawings, if an MS 20 within the H.323 system 10 (hereinafter referred to as subscriber A) makes or receives a call from another H.323 end-point 85 (hereinafter referred to as subscriber B), and at some point thereafter, puts subscriber B 85 on hold and either places a new call to another H.323 end-point 95 (hereinafter referred to as subscriber C) or receives a call from subscriber C 95, and subscriber A 20 wants to connect subscriber B 85 with subscriber C 95 into a new call between themselves, subscriber A 20 can invoke the call transfer service. It should be noted that in FIGS. 2A–2D, subscriber's B and C can be any H.323 end-point, such as another MS, an IP phone, a PC phone or a PBX terminal within the H.323 system 10.

In general, the call transfer service enables the controlling mobile subscriber (subscriber A) who has one active call (subscriber C) and one held call (subscriber B), each of which can be an incoming or outgoing call, to connect the remote parties of the two calls (subscribers B and C) and release the controlling subscriber's (subscriber A) own connection. The controlling subscriber (subscriber A) is then free to make or receive other calls. The call transfer service can be invoked using any man machine interface (MMI), such as pressing "4 SEND" on the MS 20.

As shown in FIG. 2A, before subscriber A 20 has invoked the call transfer service, the signaling connection 80 for the call between subscriber A 20 and subscriber B 85 goes from subscriber A (MS) 20 to the BTS 30, AGW 40, Access Node 50, Gatekeeper 60 and finally to subscriber B 85. Likewise, for the call between subscriber A 20 and subscriber C 95, the signaling connection 80 goes from subscriber A 20 to the BTS 30, AGW 40, Access Node 50, Gatekeeper 60 and finally to subscriber C 95. It should be understood that if the MSC and BSC functionality (shown in FIG. 1) are within two separate nodes, the connection would go to both the BSC and the MSC.

As shown in FIG. 2C, before the call transfer has been invoked, the media connection 90 (speech and/or data) for the call between subscriber A 20 and subscriber B 85 normally goes from subscriber A 20 to the BTS 30 to the media port (MP) 42 in the AGW 40 for subscriber A 20 and then from the real time protocol (RTP) port 44 assigned to the call in the AGW 40 (hereinafter referred to as RTP (held) 44) to subscriber B 85. However, since between MP 42 and RTP (held) 44 is broken, so that media from subscriber A 20 cannot reach subscriber B 85, and vice-versa.

For the call between subscriber A 20 and subscriber C 95, the media connection 90 goes from subscriber A 20 to the BTS 30, to the MP 42 in the AGW 40 and then directly from the RTP port 46 in the AGW 40 assigned to the call (hereinafter referred to as RTP (active) 46) to subscriber C 95.

Figure 3:
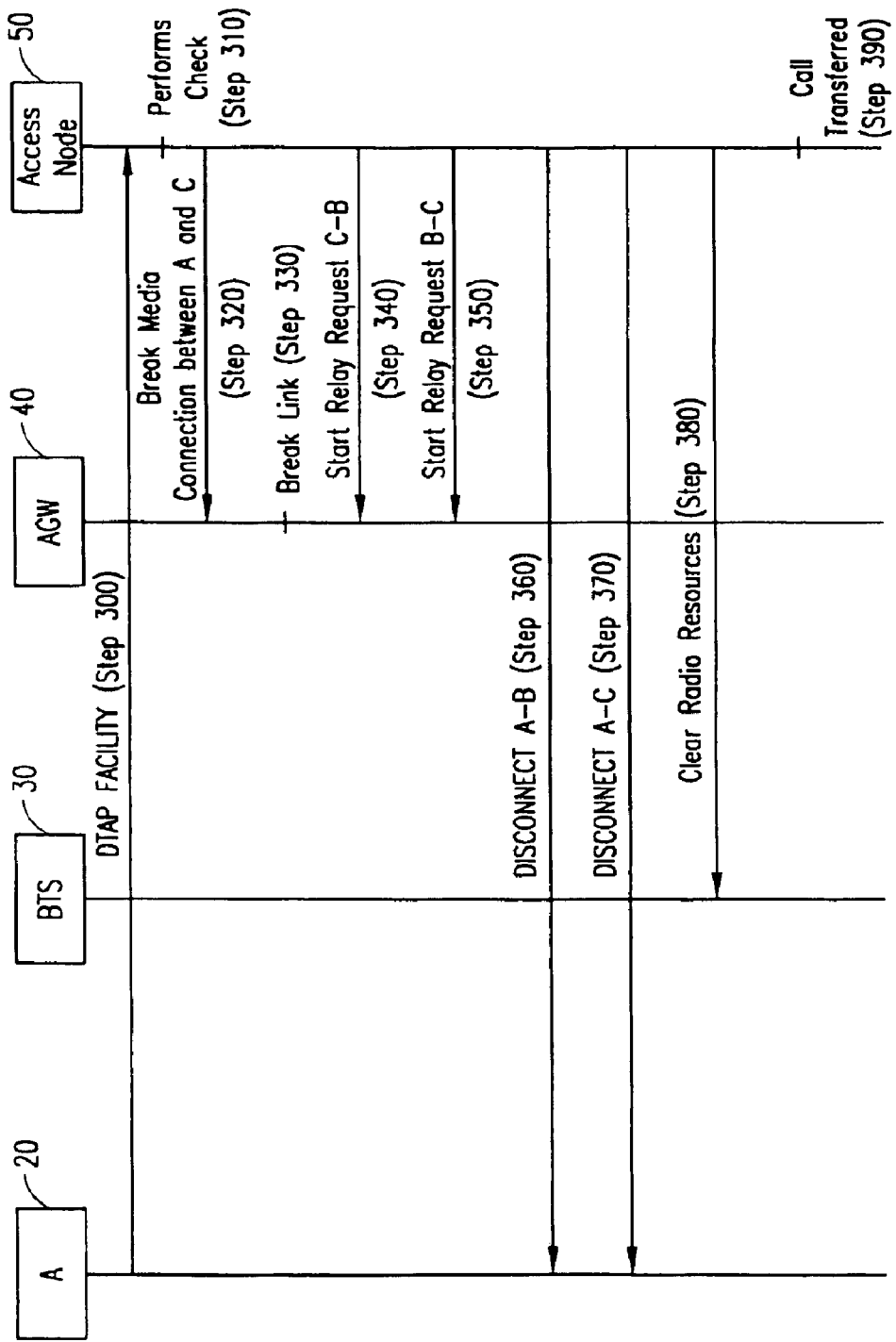
FIG. 3 is a signaling diagram illustrating the signaling involved in performing the call transfer service shown in FIGS. 2A–2D.

With reference now to FIG. 3 of the drawings, which will be described in connection with FIGS. 2A–2D of the drawings, once subscriber A 20 invokes the call transfer service, subscriber A 20 sends a DTAP FACILITY message to the Access Node 50 (step 300), which checks to make sure that subscriber A 20 is allowed to invoke the call transfer and has one active call (subscriber C 95) and one held call (subscriber B 85) (step 310). Thereafter, the Access Node 50 sends a Media Port Disconnect Request (MPDR) message to the AGW 40 (step 320), ordering the AGW 40 to break the link between the MP 42 for subscriber A 20 and RTP (active) 46. In response, the AGW 40 stops relaying the media packets received at the AGW 40 for the active call to the BTS 30 (step 330).

Thereafter, the Access Node 50 sends a Start Relay Request message to the AGW 40 (step 340) that orders the AGW 40 to start relaying media packets received on RTP (active) 46 to the IP address of the held call (subscriber B 85). The Access Node 50 also sends another Start Relay Request message to the AGW 40 (step 350) ordering the AGW 40 to start relaying media packets received on RTP (held) 44 to the IP address of the active call (subscriber C 95).

At this point, subscribers B and C are involved in a call between themselves, but the MS 20 (subscriber A) is not yet free to make and receive new calls. Therefore, in order to free subscriber A 20, the Access Node 50 sends a Disconnect message to the MS 20 for the held call (A–B call) (step 360). The held call is now disconnected from subscriber A 20. Thereafter, the Access Node 50 sends a Disconnect message for the active call to the MS 20 (step 370) to release the active call.

Finally, to clear the assigned radio resources for the MS 20, the Access Node 50 sends a message to the BTS 30 (step 380). Now, the MS 20 is free to make and receive new calls, and the MS 20 is not involved in the call connection between subscriber B 85 and subscriber C 95. Thereafter, the Access Node 50 marks the call transferred between the transferred-to 95 and transferred 85 end-points (step 390).

As shown in FIG. 2B, after the call transfer is completed, the signaling connection 80 for the transferred call goes from subscriber B 85 to the Gatekeeper 60, to the Access Node 50, to the AGW 40, back to the Access Node 50, back to the Gatekeeper 60 and finally to subscriber C 95. As shown in FIG. 2D, the media connection 90 for the transferred call goes directly from subscriber B 85, to RTP (held) 44 in the AGW 40 and finally to subscriber C 95 for media packets originated by subscriber B 85, and directly from subscriber C 95, to RTP (active) 46 in the AGW 40 and finally to subscriber C 95 for media packets originated by subscriber C 95.

Figure 4A:
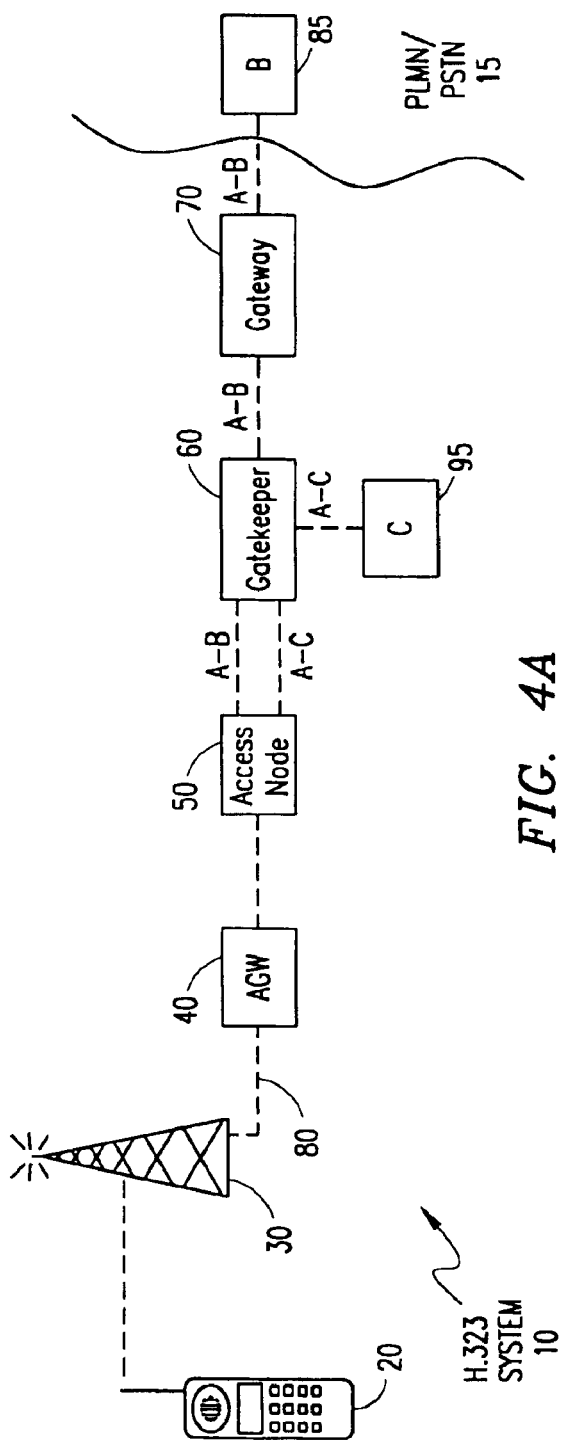

With reference now to FIGS. 4A–4D of the drawings, as discussed hereinbefore, the advantage of implementing call transfer in the afore-described way is that there is no problem when inter-working with the PLMN/PSTN 15. Therefore, when one of the remote parties (here subscriber B 85) is outside of the H.323 system 10, the call transfer service can be easily implemented without impacting the Gateway 70. Thus, as shown in FIG. 4A, before call transfer, the signaling connection 80 for the call between subscriber A 20 and subscriber B 85 goes from subscriber A 20 to the BTS 30, AGW 40, Access Node 50, Gatekeeper 60, Gateway 70 and finally to subscriber B 85. As discussed hereinbefore, for the call between subscriber A 20 and subscriber C 95, the signaling connection 80 goes from subscriber A 20 to the BTS 30, AGW 40, Access Node 50, Gatekeeper 60 and finally to subscriber C 95.

As shown in FIG. 4C, before the call transfer has been invoked, the media connection 90 (speech and/or data) for the call between subscriber A 20 and subscriber B 85 normally goes from subscriber B 85 to the Gateway 70, where the speech and/or data are converted from circuit-switched into packet-switched, to RTP (held) 44 in the AGW 40 and then to subscriber A 20 via the MP 42 in the AGW 40 for subscriber A 20 and the BTS 30. However, since subscriber B 85 is the held call, the media connection 90 between MP 42 and RTP (held) 44 is broken so that media from subscriber A 20 cannot reach subscriber B 85, and vice-versa. As discussed hereinbefore, for the call between subscriber A 20 and subscriber C 95, the media connection 90 goes from subscriber A 20 to the BTS 30, to the MP 42 in the AGW 40 for subscriber A 20 and then directly from RTP (active) 46 in the AGW 40 to subscriber C 95.

Figure 4B:
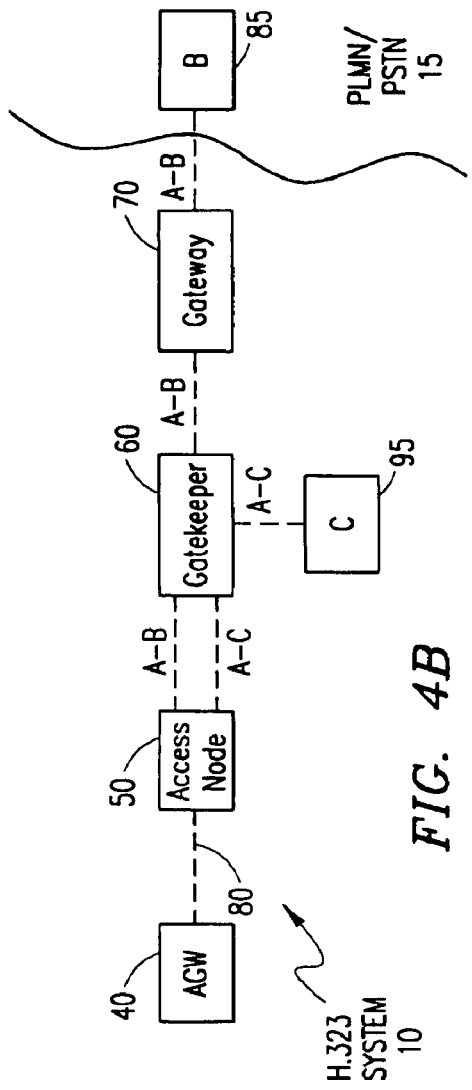

After call transfer has been completed in accordance with the steps shown in FIG. 3 of the drawings, as shown in FIG. 4B, the signaling connection 80 for the transferred call goes from subscriber B 85 to the Gateway 70, to the Gatekeeper 60, to the Access Node 50, to the AGW 40, back to the Access Node 50, back to the Gatekeeper 60 and finally to subscriber C 95. As shown in FIG. 4D, the media connection 90 for the transferred call goes from subscriber B 85, to the Gateway 70, to RTP (held) 44 in the AGW 40, and then directly to subscriber C 95 for speech and/or data originated by subscriber B 85, and from subscriber C 95 to RTP (active) 46 in the AGW 40 to the Gateway 70 and finally to subscriber B 85 for media packets originated by subscriber C 95.

With reference now to FIGS. 5A–5D of the drawings, when both remote parties (subscriber's B 85 and C 95) are outside of the H.323 system 10, here shown within the PLMN/PSTN 15, the process is similar to that described in connection with FIGS. 4A–4D of the drawings. However, it should be noted that more than one Gateway 70 may be involved if subscriber's B 85 and C 95 are within different networks served by different Gateways 70. For example, if subscriber B 85 and subscriber C 95 are within two different countries, two Gateways 70 may be involved.

Figure 5C:
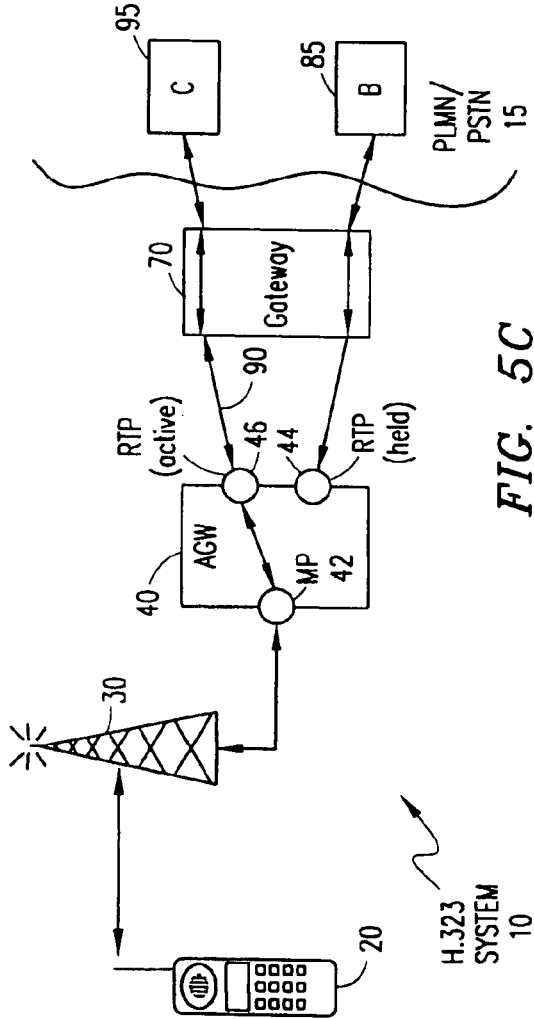

For convenience, only one Gateway 70 is shown in FIGS. 5A–5D. In this case, as shown in FIG. 5A, before call transfer, the signaling connection 80 for the call between subscriber A 20 and subscriber B 85 goes from subscriber A 20 to the BTS 30, AGW 40, Access Node 50, Gatekeeper 60, Gateway 70 and finally to subscriber B 85. Likewise, for the call between subscriber A 20 and subscriber C 95, the signaling connection 80 goes from subscriber A 20 to the BTS 30, AGW 40, Access Node 50, Gatekeeper 60, Gateway 70 and finally to subscriber C 95.

As shown in FIG. 5C, before the call transfer has been invoked, the media connection 90 (speech and/or data) for the call between subscriber A 20 and subscriber B 85 is not active since subscriber B 85 is the held call, and therefore, the connection between MP 42 and RTP (held) 44 is broken. For the active call between subscriber A 20 and subscriber C 95, the media connection 90 goes from subscriber A 20 to the BTS 30, to the MP port 42 in the AGW 40 for subscriber A 20, from RTP (active) 46 in the AGW 40 to the Gateway 70 and finally to subscriber C 95.

Figure 5D:
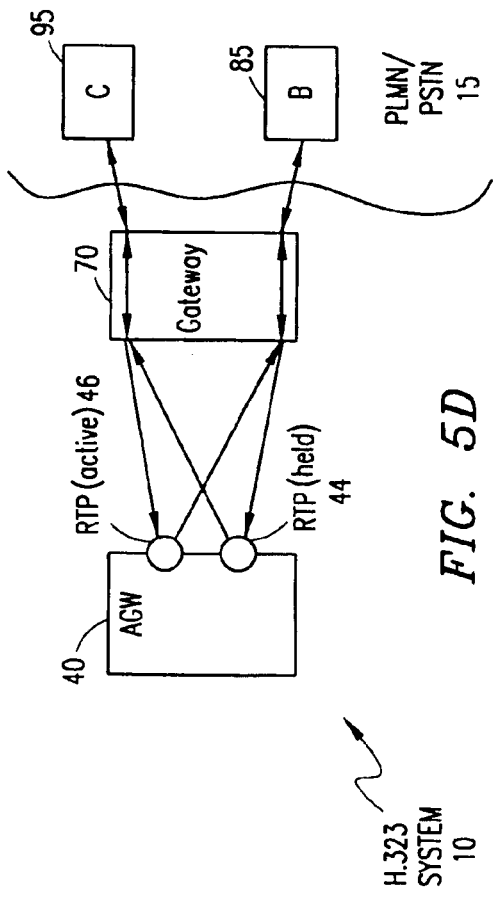

After call transfer has been completed in accordance with the steps shown in FIG. 3 of the drawings, as shown in FIG. 5B, the signaling connection 80 for the transferred call goes from subscriber B 85 to the Gateway 70, to the Gatekeeper 60, to the Access Node 50, to the AGW 40, back to the Access Node 50, back to the Gatekeeper 60, back to the Gateway 70 and finally to subscriber C 95. As shown in FIG. 5D, the media connection 90 for the transferred call goes from subscriber B 85 to the Gateway 70, to RTP (held) 44 in the AGW 40, back to the Gateway 70 and finally to subscriber C 95 for speech and/or data originated by subscriber B 85. For speech and/or data originated by subscriber C 95, the media connection 90 goes from subscriber C 95, to the Gateway 70, to RTP (active) 46 in the AGW 40, back to the Gateway 70 and finally to subscriber B 85.

The situation is more complicated if subscriber A has performed an internal handover within the H.323 system when subscriber A invokes the call transfer service. An internal handover would normally occur when the MS has moved to a different cell served by a different BTS within the H.323 system. The media connection for the two calls (held call and active call) before the call transfer has been invoked is shown in FIG. 6A. For convenience, both of the remote parties (subscribers B 85 and C 95) are shown inside of the H.323 system 10. However, it should be understood that subscribers B 85 and C 95 can be within any system, as discussed in connection with FIGS. 4 and 5.

As shown in FIG. 6A, before call transfer, the media connection 90 for the call between subscriber A 20 and subscriber B 95 is not active, and therefore, the connection between MP 42 and RTP (held) 44 is broken, so that media from subscriber A 20 cannot reach subscriber B, and vice-versa. Thus, the media connection 90 is shown going directly between subscriber B 85 to RTP (held) 44 in the anchor AGW 40a, which is the AGW 40a that subscriber A 20 has been handed over from.

For the active call between subscriber A 20 and subscriber C 95, the media connection 90 is more complicated. For media packets sent to subscriber C 95, the connection goes from subscriber A 20 to the BTS 30, to the MP 42 for subscriber A 20 in the non-anchor AGW 40b, which is the AGW 40b that subscriber A 20 has been handed over to, from the RTP port 49 for the call in the non-anchor AGW 40b to RTP (active) 46 in the anchor AGW 40a and finally to subscriber C 95. For media packets sent to subscriber A 20, the media connection goes from subscriber C 95 to RTP (active) 46 in the anchor AGW 40a, to the RTP port 49 assigned to the call in the non-anchor AGW 40b, to the BTS 30 via the MP 42 for subscriber A 20 in the non-anchor AGW 40b and finally to subscriber A 20.

Figure 7:
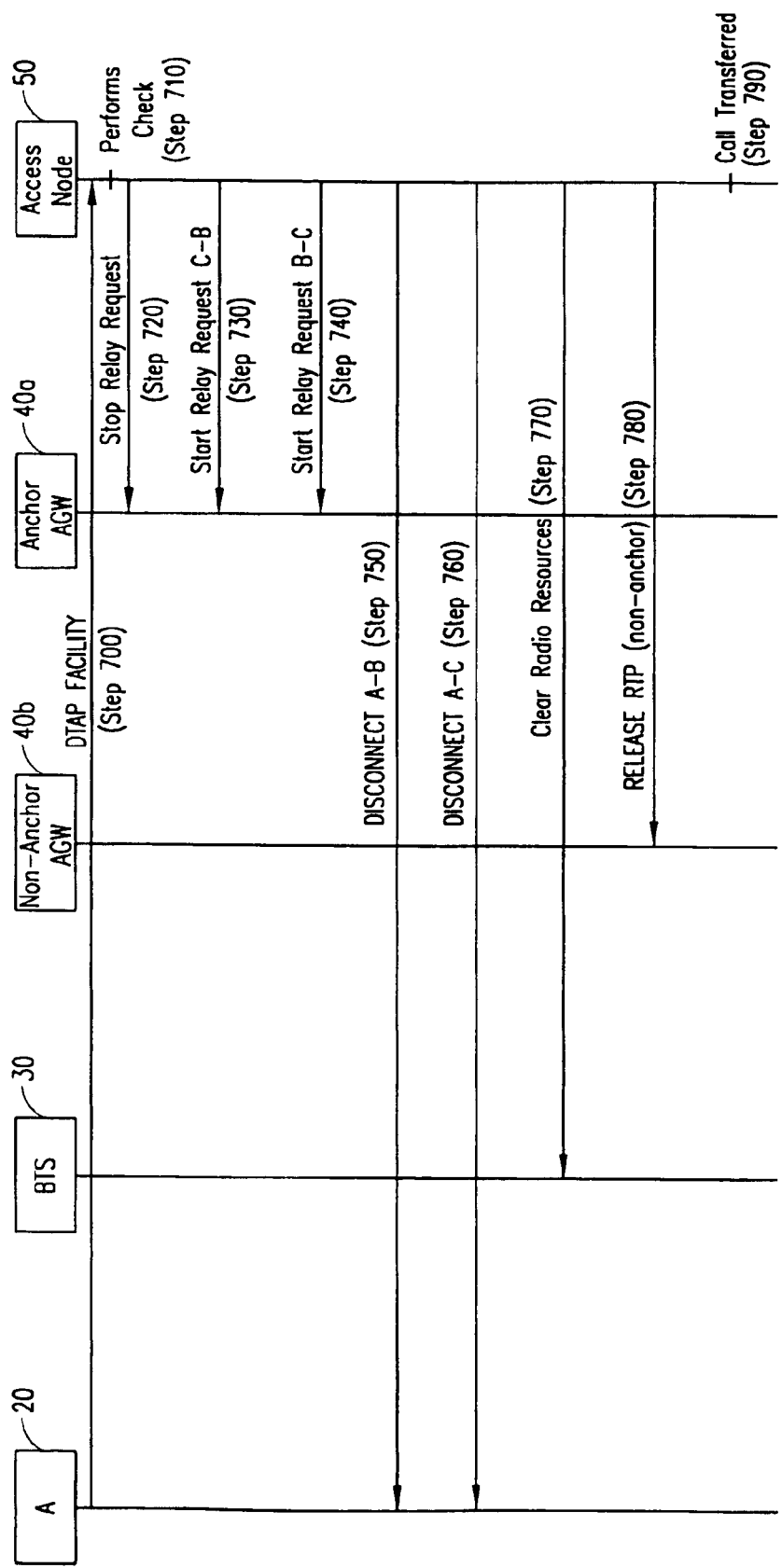
FIG. 7 is a signaling diagram illustrating the signaling involved in performing the call transfer service shown in FIGS. 6A and 6B.

With reference now to FIG. 7 of the drawings, which will be described in connection with FIGS. 6A and 6B of the drawings, as in the typical case discussed above in connection with FIG. 3, to invoke the call transfer service, the MS 20 sends a DTAP FACILITY message to the Access Node 50 (step 700). Thereafter, the Access Node 50 checks to make sure that subscriber A 20 has one active call (subscriber C 95) and one held call (subscriber B 85) (step 710).

In order to perform call transfer when subscriber A has performed an internal handover, the Access Node 50 sends a Stop Relay Request message to the anchor AGW 40a to order the anchor AGW 40a to stop relaying packets between RTP (active) 46 in the anchor AGW 40a and the RTP port 49 in the non-anchor AGW 40b (step 720). Thereafter, the Access Node 50 sends the Start Relay Request message to the anchor AGW 40a, which orders the anchor AGW 40a to start relaying media packets received on RTP (active) 46 to the IP address of the end-point associated with the held call (subscriber B 85) (step 730). The Access Node 50 also sends another Start Relay Request message to the anchor AGW 40a, which orders the anchor AGW 40a to start relaying media packets received on RTP (held) 44 (from subscriber B 85) to the IP address of the end-point associated with the active call (subscriber C 95) (step 740).

At this point, subscribers B 85 and C 95 are involved in a call between themselves, but the MS (subscriber A 20) is not yet free to make and receive new calls. Therefore, as discussed above in connection with FIG. 3, in order to free subscriber A 20, the Access Node 50 sends a Disconnect message to the MS 20 for the held call (A–B call) (step 750). The held call is now disconnected from subscriber A 20. The same process occurs for the active call (Access Node 50 sends a Disconnect message (step 760) for the active call to the MS 20).

To clear the assigned radio resources for the MS 20, the Access Node 50 sends a message to the BTS 30 (step 770). Now, the MS 20 is free to make and receive new calls, and the MS 20 is not involved in the call connection between subscriber B 85 and subscriber C 95. Finally, to release the assigned RTP port 49 in the non-anchor AGW 40b, the Access Node 50 orders the non-anchor AGW 40b to release the assigned RTP port 49 in the non-anchor AGW 40b (step 780). Thereafter, the Access Node 50 marks the call transferred between the transferred-to and transferred end-points (step 790).

As shown in FIG. 6B, after call transfer, media packets originated by subscriber B 85 go from subscriber B 85 to RTP (held) 44 in the anchor AGW 40a and then to subscriber C 95. For media packets originated by subscriber C 95, the media connection 90 goes from subscriber C 95 to RTP (active) 46 in the anchor AGW 40a to subscriber B 85.

Figure 8A:
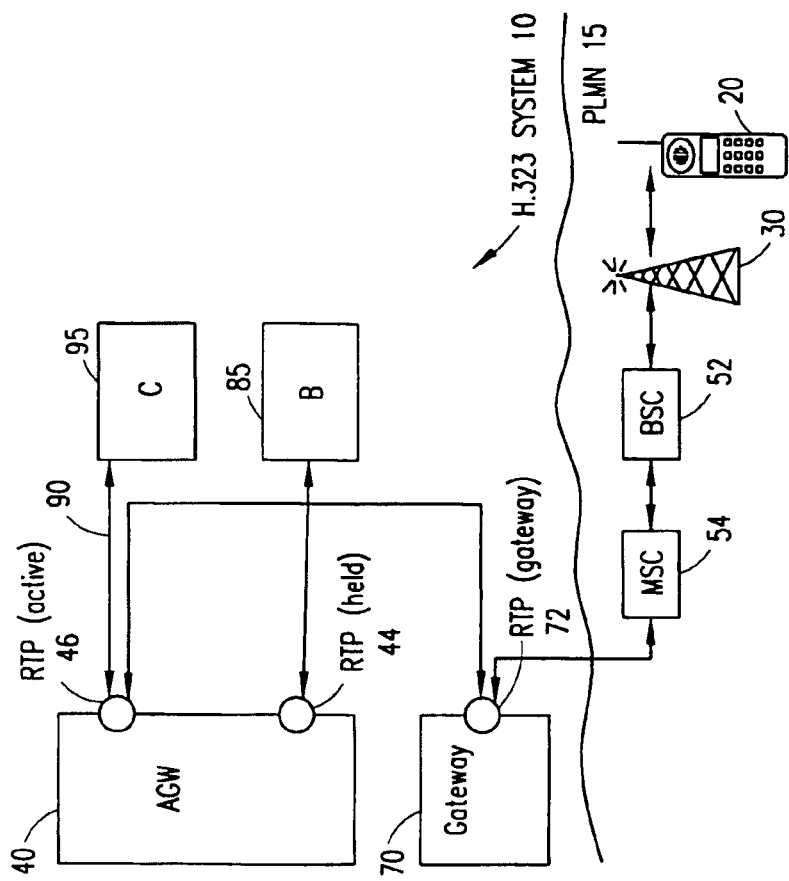
FIGS. 8A and 8B are block diagrams illustrating the implementation of the call transfer service within an H.323 system where the transferring end-point has performed a handover outside of the H.323 system.

A similar situation occurs when subscriber A has performed an external handover to a BTS outside of the H.323 system. As shown in FIG. 8A, when subscriber A 20 has roamed outside of the H.323 system 10, e.g., within the PLMN 15, the media connection 90 is close to that shown in FIG. 6A, except that there is not a non-anchor AGW. Instead, the media packets from subscriber C 95 for the active call are routed between RTP (active) 46 in the AGW 40 originally serving the MS 20 and an RTP port 72 for the MS 20 in the Gateway 70. The Gateway 70 converts the media packets from packet-switched to circuit-switched and transmits the circuit-switched speech and/or data from the RTP port 72 for the MS 20 in the Gateway 70 to the PLMN 15, which relays the speech and/or data to the MS 20 via a MSC 54, BSC 52 and BTS 30 within the PLMN 15 serving the MS 20. Likewise, speech and/or data received from the MS 20 at the RTP port 72 in the Gateway 70 are converted into media packets and routed to subscriber C 95 via RTP (active) 46 within the AGW 40.

Figure 8B:
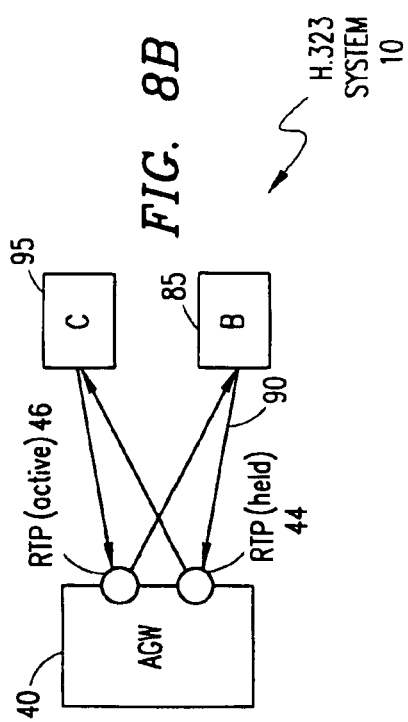
Figure 9:
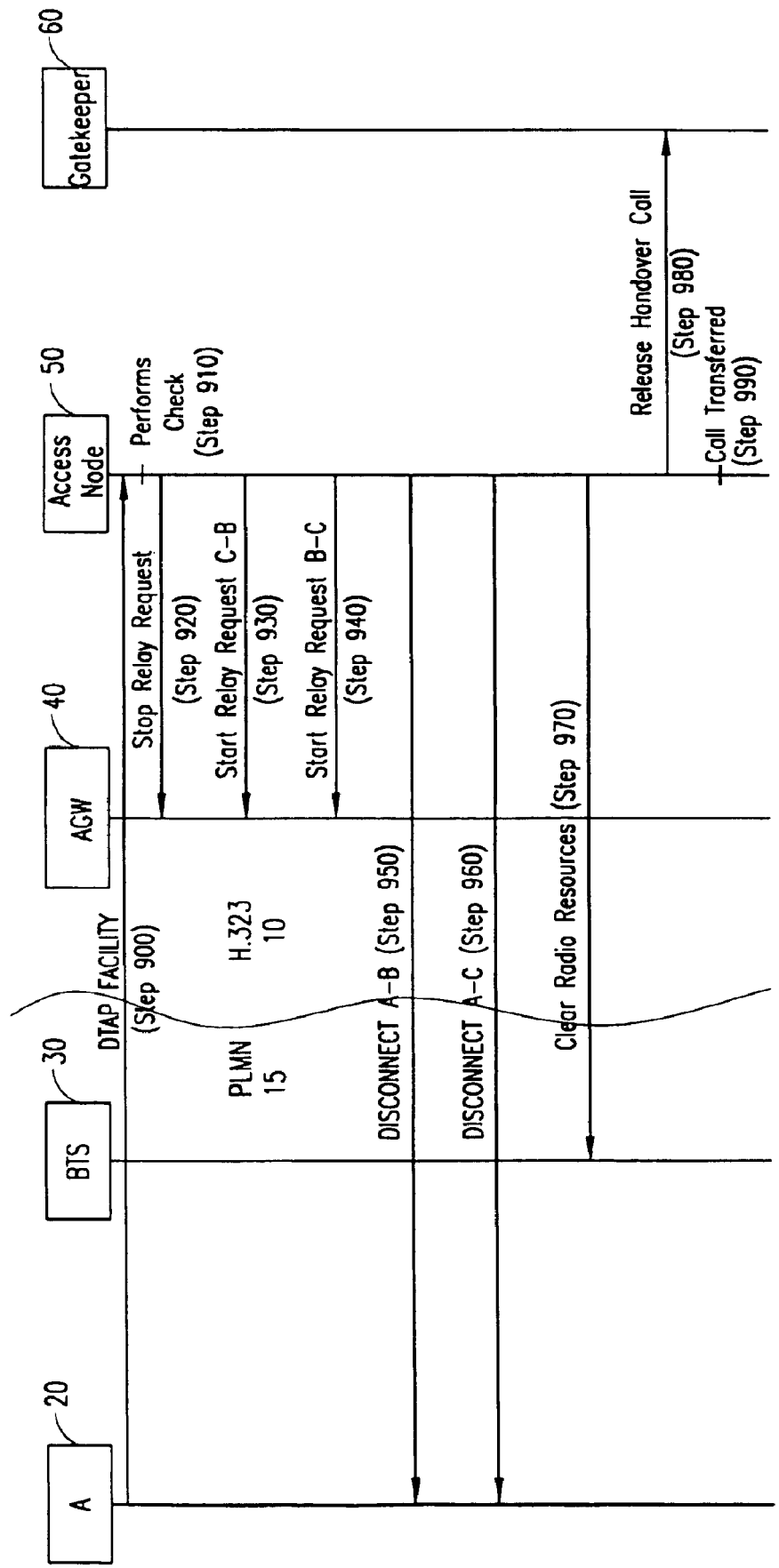
FIG. 9 is a signaling diagram illustrating the signaling involved in performing the call transfer service shown in FIGS. 8A and 8B.

With reference now to FIG. 9, which will be discussed in connection with FIGS. 8A and 8B of the drawings, the call transfer service can still be invoked even in this case. As discussed hereinbefore, to invoke the call transfer service, the MS 20 sends a DTAP FACILITY message to the Access Node 50 (step 900). It should be understood that all messages sent between the Access Node 50 and the MS 20 (and MSC 54, BSC 52 and BTS 30) within the PLMN 15 go through the Gateway 70. The Access Node 50 then checks to make sure that subscriber A 20 has one active call and one held call (step 910).

Thereafter, the Access Node 50 sends the Stop Relay Request message to the AGW 40, which orders the AGW 40 to stop relaying packets from RTP (active) 46 in the AGW 40 to the RTP port 72 for the MS 20 in the Gateway 70 (step 920). Thereafter, the Access Node 50 sends the Start Relay Request message to the AGW 40, which orders the AGW 40 to start relaying voice packets received on RTP (active) 46 to the IP address of the end-point for the held call (subscriber B 85) (step 930). The Access Node 50 also sends another Start Relay Request message to the AGW 40 that orders the AGW 40 to start relaying voice packets received on RTP (held) 44 to the IP address of the end-point for the active call (subscriber C 95) (step 940).

At this point, subscribers B 85 and C 95 are involved a call between themselves, but subscriber A 20 is not yet free to make and receive new calls. Therefore, in order to free subscriber A 20, the Access Node 50 sends a Disconnect message (encapsulated in a MAP_Forward_Access_Signalling message) to the MS 20 for the held call (A–B call) (step 950). The held call is now disconnected from subscriber A. The same process occurs for the active call (Access Node 50 sends an encapsulated Disconnect message (step 960) for the active call to the MS 20).

To clear the assigned radio resources for the MS 20, the Access Node 50 sends a message (encapsulated in a MAP_Forward_Access_Signalling message) to the BTS 30 within the PLMN 15 (step 970). Now, the MS 20 is free to make and receive new calls, and the MS 20 is not involved in the call connection between subscriber B 85 and subscriber C 95. Finally, the Access Node 50 sends a message to release the handover call to the Gatekeeper 60 (step 980). Thereafter, the Access Node 50 marks the call transferred between the active and held end-points (step 990).

As shown in FIG. 8B, after call transfer, media packets originated by subscriber B 85 go from subscriber B 85 to RTP (held) 44 in the AGW 40 and then to subscriber C 95. For media packets originated by subscriber C 95, the media connection 90 goes from subscriber C 95 to RTP (active) 46 in the AGW 40 to subscriber B 85.

Figure 10:
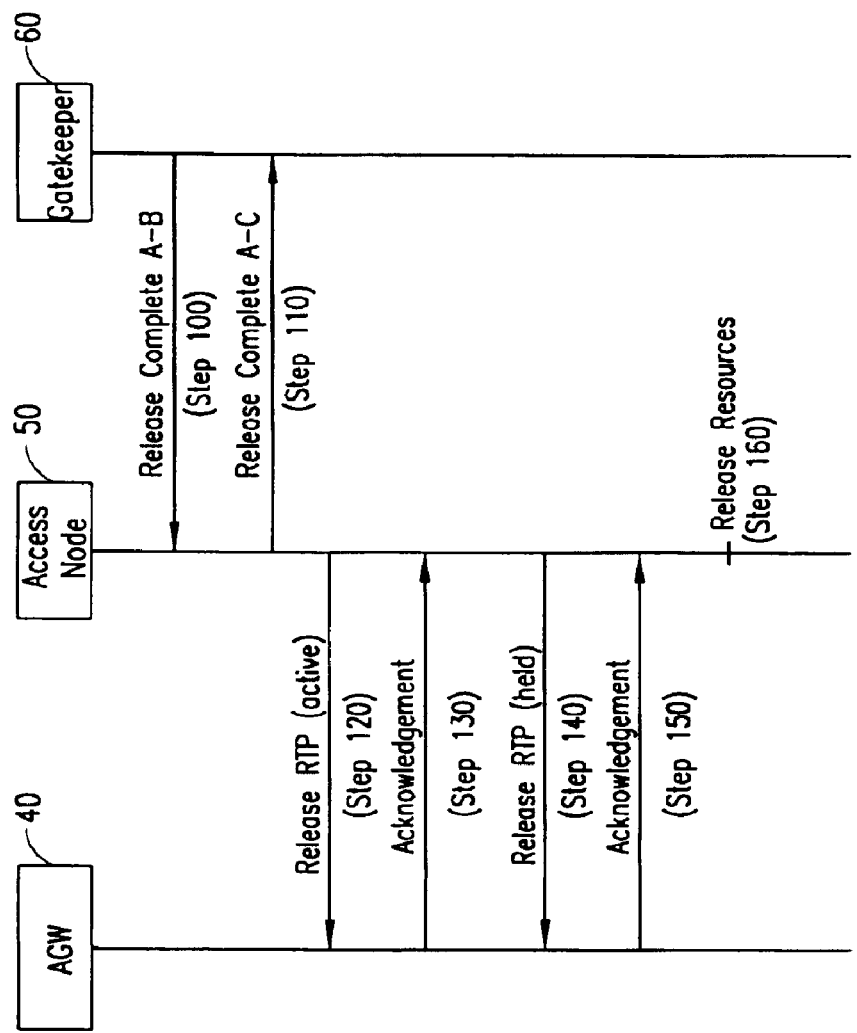
FIG. 10 is a signaling diagram illustrating the signaling involved in disconnecting the transferred call in accordance with any embodiment of the present invention.

With reference now to FIG. 10 of the drawings, the steps for either subscriber B or subscriber C to disconnect the transferred call are shown. It should be noted that it makes no difference in the disconnect process where subscriber's B and C are located or whether there is one AGW, two AGWs or one AGW and one Gateway involved.

If, for example, subscriber B disconnects the call (hangs up), the Gatekeeper 60 transmits a Release Complete message to the Access Node 50 for the A–B call (step 100). Thereafter, the Access Node 50 sends a Release Complete message to the Gatekeeper 60 for the A–C call (step 110).

Subsequently, the Access Node 50 sends a release RTP message to the AGW 40 for releasing RTP (active) (step 120). After the AGW 40 releases RTP (active), the AGW 40 sends an Acknowledgment message back to the Access Node 50 (step 130). The Access Node 50 also sends a release RTP message to the AGW 40 for releasing RTP (held) (step 140). After the AGW 40 releases RTP (held), the AGW 40 sends an Acknowledgment message back to the Access Node 50 (step 150). Finally, the Access Node 50 releases all of it's resources for the A–B call and the A–C call (step 160).

Advantageously, by routing the transferred call through the AGW, the same two charging records that were generated before call transfer (for A–B call and A–C call) keep gathering data and are not closed until B or C disconnects. In addition, neither the B nor C subscriber needs to have knowledge of the transfer (i.e. subscriber's B and C still route to subscriber A, so they do not need to change the IP address of the receiving end-point). Furthermore, interworking with the PLMN/PSTN is easily implemented without impacting the Gateway.

Figure 11:
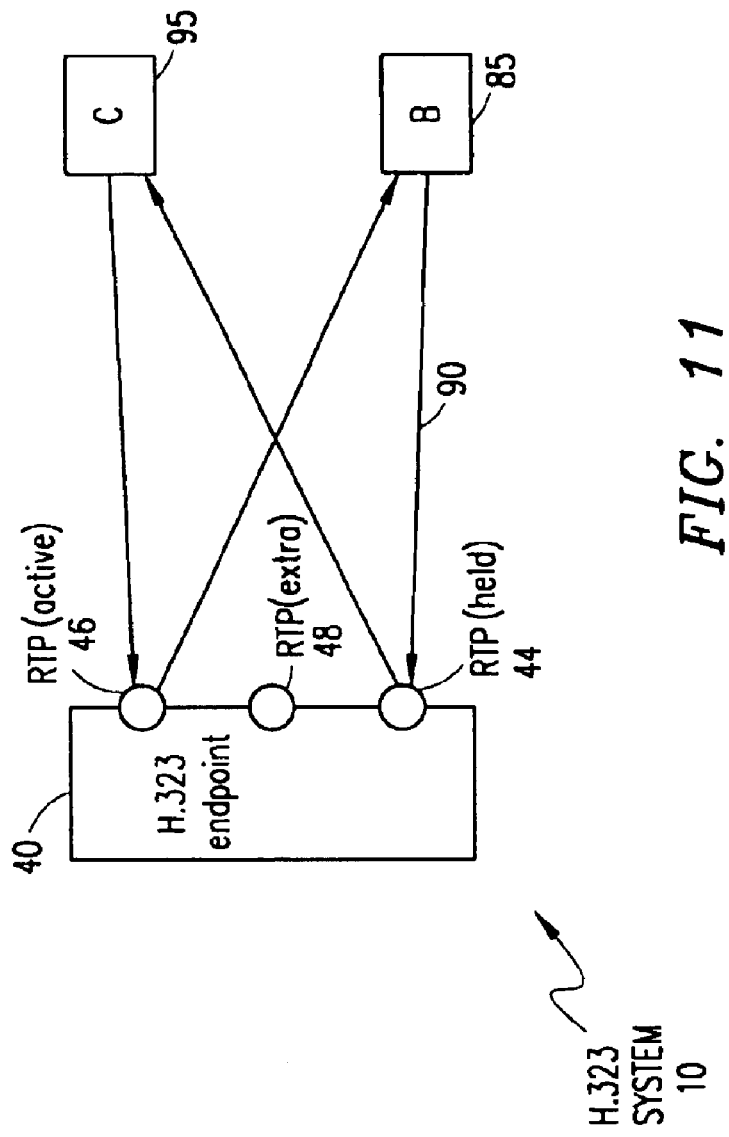
FIG. 11 is a block diagram illustrating the implementation of the call transfer service within an H.323 system when the transferring subscriber is a regular H.323 end-point (i.e. fixed type).

With reference now to FIG. 11 of the drawings, the above-described call transfer system and method can also be used when the transferring end-point is a regular (fixed) H.323 end-point, such as a PC, IP phone or PBX. In this case, as long as the transferring H.323 end-point has three RTP ports associated with it, one for the active call RTP (active) 46, one for the held call RTP (held) 44 and one additional RTP port, denoted as RTP (extra) 48, call transfer can be achieved.

Instead of the Access Node 50 instructing the AGW 40 to relay media 90 between subscribers B 85 and C 95 (as shown in FIGS. 2, 4 and 5), the H.323 end-point 40 needs to perform similar actions. Thus, in this case, the controlling node for the call transfer service is the where the H.323 end-point includes an MS, the controlling node is the Access Node 50. After call transfer, the H.323 end-point 40 is free to make and receive new calls on RTP (extra) 48.

It should be understood that if subscriber B 85 and/or subscriber C 95 is outside of the H.323 system 10, the signaling 80 and media connections 90 will be similar to those shown in FIGS. 4 and 5, except that the Access Node 50 and AGW 40 of FIGS. 4 and 5 are replaced by the transferring H.323 end-point 40.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A packet switched network for performing a call transfer service, comprising:

a transferring end-point within said packet switched network and involved in a held call with a first subscriber and an active call with a second subscriber, said transferring end-point having an active port associated with said active call, a held port associated with said held call and at least one additional port; and a controlling node within said packet switched network and connected to said transferring end-point, in response to the initiation of a call transfer service by said transferring end-point of said first subscriber to said second subscriber, said controlling node establishing communication between said held call and said active call by relaying media packets between said active port to said first subscriber and said held port to said second subscriber wherein said first subscriber and said second subscriber communicating there between by using said active port associated with said transferring end-point as the destination address and wherein said connection to said transferring end-point has been disconnected by said controlling node allowing said transferring end-point to make and receive other calls;

wherein said transferring end-point comprises a mobile station in wireless communication with an A-bis gateway within said packet switched local area network, said A-bis gateway having said active port, said held port and said at least one additional port associated therewith; and wherein said controlling node is an access node connected to said A-bis gateway, said access node being further adapted to order said A-bis gateway to disconnect said active call and said held call upon initiation of said call transfer service and wherein said A-bis gateway is an anchor A-bis gateway, and wherein said transferring end-point further comprises a non-anchor A-bis gateway, a moblie station being handed over from said anchor A-bis gateway to said non-anchor A-bis gateway prior to initiating said call transfer service, said non-anchor A-bis gateway having a media port associated with said mobile station and a non-anchor port associated therewith, said non-anchor port being connected to said active port, said access node being further adapted to order said non-anchor A-bis gateway to release said non-anchor port to disconnect said active port from said non-anchor port.

2. The packet switched local area network of claim 1, wherein said A-bis gateway is adapted to convert between said media packets containing data that are transmitted over said packet switched local area network and circuit-switched information containing said data that are transmitted between said mobile station and said A-bis gateway.

3. The packet switched local area network of claim 1, further comprising;
a base transceiver station connected to said A-bis gateway and in wireless communication with said mobile station, said access node being further adapted to order said base transceiver station to release radio resources assigned to said active call and said held call upon initiation of said call transfer service.

4. The packet switched local area network of claim 1, wherein said A-bis gateway has a media port associated with said mobile station associated therewith, said media port being linked to said active port, said access node being further adapted to order said A-bis gateway to disconnect the link between said media port and said active port.

5. The packet switched local area network of claim 1, wherein said mobile station hands over into an additional network outside of said packet switched local area network prior to initiating said call transfer service, and wherein said transferring end-point further comprises a gateway connected to said A-bis gateway and said mobile station, said gateway being adapted to convert between said packet switched local area network and said additional network, said gateway having a gateway port associated with said mobile station associated therewith, said gateway port being connected to said active port, said access node being further adapted to order said gateway to release said gateway port to disconnect said active port from said gateway port.

6. The packet switched local area network of claim 1, wherein said access node is further adapted to order said A-bis gateway to release said active port and said held port in response to disconnection of said transferred call by said first subscriber or said second subscriber.

7. The packet switched local area network of claim 1, further comprising:
a Gatekeeper connected to said access node, said Gatekeeper being adapted to send and receive signaling messages between said first subscriber and said second subscriber via said access node and said A-bis gateway after said call transfer service has been performed.

8. The packet switched local area network of claim 1, wherein said controlling node is said transferring end-point, said transferring end-point being further adapted to send and receive signaling messages between said first and second subscriber after said call transfer service has been performed.

9. The packet switched local area network of claim 1, wherein said first subscriber and said second subscriber are additional end-points within said packet switched local area network.

10. The packet switched local area network of claim 1, wherein at least one of said first subscriber and said second subscriber are within an additional network outside of said packet switched focal area network.

11. The packet switched local area network of claim 10, further comprising:
a gateway connected to said transferring end-point, said gateway being adapted to convert between said packet switched local area network and said additional network, said media packets that are transmitted to and from said at least one of said first subscriber and said second subscriber that are within said additional network being routed through said gateway.

12. A method for performing a call transfer service within a packet switched network, comprising the steps of:
initiating said call transfer service by a transferring end-point involved in a held call with a first subscriber and an active call with a second subscriber, said transferring end-point having an active port associated with said active call, a held port associated with said held call and at least one additional port; and relaying by a controlling node connected to said transferring end-point, media packets between said active port to said first subscriber and said held port to said second subscriber thereby establishing communication between said first subscriber and said second subscriber wherein said first subscriber and said second subscriber communicating there between using said active port associated with said transferring end-point as the destination address and wherein said controlling node further disconnecting with said transferring end-point and allowing said transferring end-point to make and receive other calls;

wherein said transferring end-point comprises a mobile station in wireless communication with an A-bis gateway within said packet switched local area network, said A-bis gateway having said active port, said held port and said at least one additional port associated therewith;

wherein said controlling node is an access node connected to said A-bis gateway, and further comprising the step of ordering, by said access node, said A-bis gateway to disconnect said active call and said held call; and wherein said A-bis gateway is an anchor A-bis gateway, said transferring end-point further comprising a non-anchor A-bis gateway, and further comprising the steps of:

performing a hand over, by said mobile station, from said anchor A-bis gateway to said non-anchor A-bis gateway prior to said step of initiating, said non-anchor A-bis gateway having a media port associated with said mobile station and a non-anchor port associated therewith, said non-anchor port being connected to said active port; and ordering, by said access node, said non-anchor A-bis gateway to release said non-anchor port to disconnect said active port from said non-anchor port.

13. The method of claim 12, further comprising the step of:

ordering, by said access node, a base transceiver station connected to said A-bis gateway and in wireless communication with said mobile station to release radio resources assigned to said active call and said held call.

14. The method of claim 12 wherein said A-bis gateway has a media port associated with said mobile station associated therewith, said media port being linked to said active port, and further comprising the step of:

ordering, by said access node, said A-bis gateway to disconnect the link between said media port and said active port.

15. The method of claim 12, wherein said transferring end-point further comprises a gateway connected to said A-bis gateway and said mobile station, and further comprising the steps of:

handing over, by said transferring end-point, into an additional network outside of said packet switched local area network prior to said step of initiating, said mobile station being connected to said packet switched local area network through said gateway, said gateway for converting between said packet switched local area network and said additional network, said gateway having a gateway port associated with said mobile station associated therewith, said gateway port being connected to said active port; and ordering, by said access node, said gateway to release said gateway port to disconnect said active port from said gateway port.

16. The method of claim 12, further comprising the step of:

ordering, by said access node, said A-bis gateway to release said active port and said held port in response to disconnection of said transferred call by said first subscriber or said second subscriber.

17. The method of claim 12, further comprising the step of:

transmitting, by a Gatekeeper connected to said access node, signaling messages between said first subscriber and said second subscriber via said access node and said A-bis gateway after said call transfer service has been performed.

18. The method of claim 12, wherein said controlling node is said transferring end-point, and further comprising the step of:

transmitting, by said transferring end-point, signaling messages between said first and second subscriber after said call transfer service has been performed.

19. The method of claim 12, wherein said first subscriber and said second subscriber are end-points within said packet switched local area network.

20. The method of claim 12, wherein at least one of said first subscriber and said second subscriber are within an additional network outside of said packet switched local area network.

21. The method of claim 20, further comprising the step of:

routing said media packets that are transmitted to and from said at least one of said first subscriber and said second subscriber that are within said additional network through a gateway connected to said controlling node, said gateway for converting between said packet switched local area network and said additional network.

* * * * *

UNITED STATES PATENT AND TRADEMARK OFFICE
CERTIFICATE OF CORRECTION

| | | |
|---|---|---|
| PATENT NO. | : 6,904,027 B1 | Page 1 of 1 |
| APPLICATION NO. | : 09/641437 | |
| DATED | : June 7, 2005 | |
| INVENTOR(S) | : Mukherjee et al. | |

It is certified that error appears in the above-identified patent and that said Letters Patent is hereby corrected as shown below:

In Column 1, Line 32, after "IP" insert -- address for the H.323 endpoint, so that when a connection --.

In Column 3, Line 51, after "shown in" insert -- FIGURE 1, the H.323 end-point includes a Mobile Station --.

In Column 5, Line 8, after "since" insert -- subscriber B 85 is the held call, the media connection --.

In Column 8, Line 1, after "A" insert -- 20 --.

In Column 10, Line 24, after "is the" insert -- H.323 end-point 40 itself, whereas for the situation --.

In Column 12, Line 12, in Claim 10, delete "focal" and insert -- local -- , therefor.

Signed and Sealed this

Thirteenth Day of November, 2007

JON W. DUDAS
*Director of the United States Patent and Trademark Office*